UNITED STATES PATENT OFFICE.

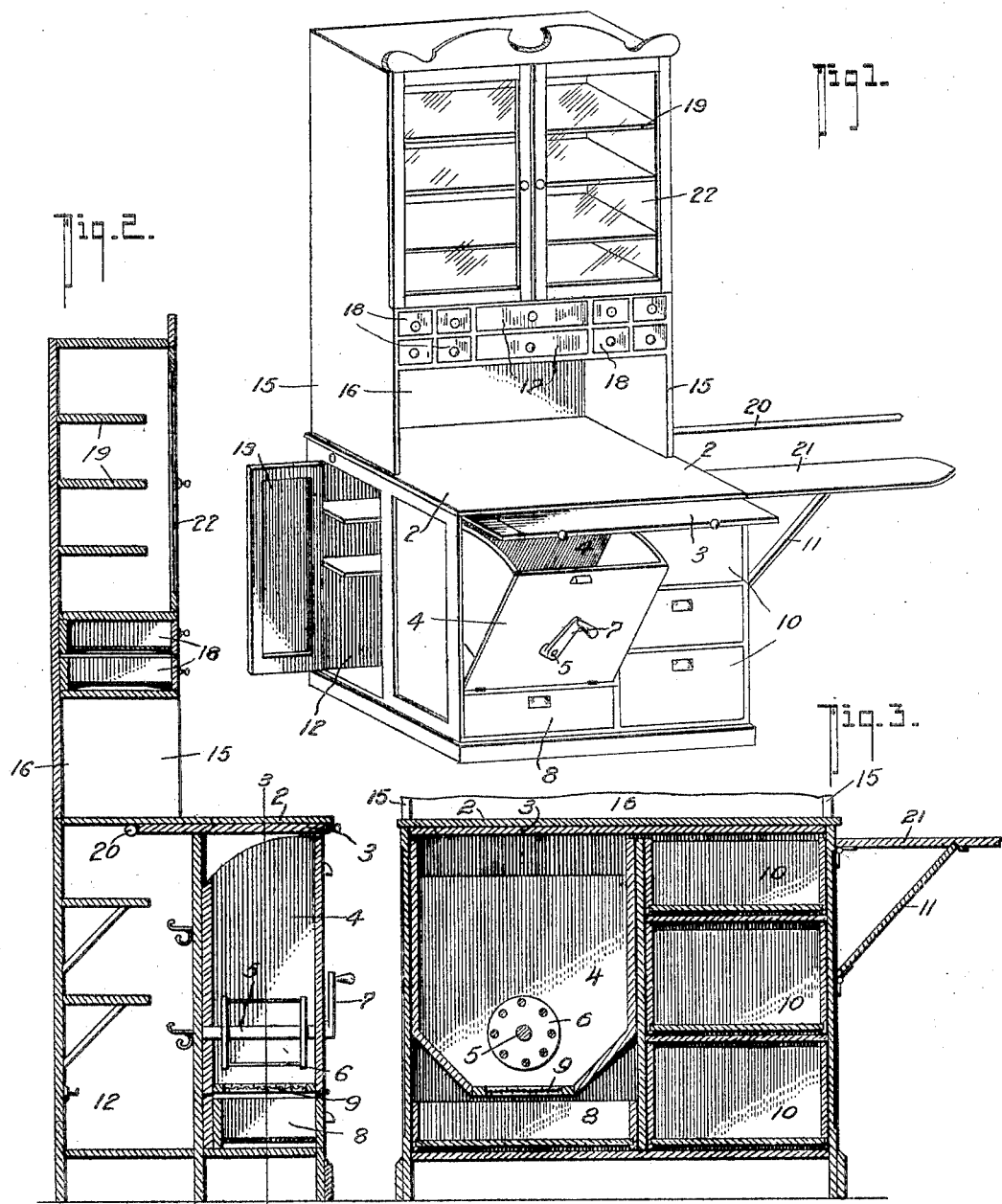

SHERMAN H. FORD, OF VICTORIA, CANADA.

KITCHEN-CABINET.

No. 797,422. Specification of Letters Patent. Patented Aug. 15, 1905.

Application filed October 13, 1904. Serial No. 228,335.

*To all whom it may concern:*

Be it known that I, SHERMAN H. FORD, a citizen of the United States of America, residing at Victoria, in the Province of British Columbia, Canada, have invented new and useful Improvements in Kitchen-Cabinets, of which the following is a specification.

My invention relates to the construction and arrangement of the various parts of a kitchen-cabinet designed to render the same more comprehensive to the requirements of such an article and enable it to comprise within its scope the accommodation usually required in connection therewith. Where families are living in apartments which are not supplied with the usual furnishing of a kitchen, such as pantry and cupboard, it is manifestly convenient to have an article of furniture of this character which may contain the many odds and ends required for culinary and other kindred purposes in positions to be within easy reach. I have with this end in view designed a cabinet the base portion of which is provided with an ample table-space, beneath which a baking-board is slidable in a space provided, and under this on one side is a flour-bin opening to the front and having in its base a sifter through which the flour may fall into a drawer beneath. On the opposite side of the lower portion I provide a series of deep drawers, and toward the back of this base portion a space is inclosed which is provided with doors at each side and furnished with hooks and racks for the bestowal of cooking-pans, &c. Surmounting the base portion is an upper cabinet with a sufficient space clear of the table of the base portion so as not to interfere with its free use. This upper part of the cabinet is provided with shelves as a dish-cupboard and is furnished with glass doors, and beneath the dish-cupboard is a series of shallow drawers adapted to hold the many smaller articles which are required during the preparation of food for cooking. There are also sundry other conveniences connected with the cabinet, which shall be referred to at length in the following specification, which fully describes the construction and arrangement of the various parts, which is illustrated in the drawings herewith.

Figure 1 is a general perspective view of the cabinet complete, and Fig. 2 a vertical section on a plane through the flour-hopper. Fig. 3 is a cross-section on the line 3 3 of Fig. 2.

As shown in the drawings, the base portion is constructed apart, so that the cupboard above may be detached for convenience of transportation, and the base portion is provided with an ample table 2. Immediately beneath the table is accommodation for a baking-board 3, which may be slidably withdrawn entirely when required and placed on the table. The flour-bin 4 is hinged toward its lower front edge to the frame of the cabinet and opens outward, as indicated. The bottom of the bin is contracted toward the sifter-screen 9 to bring the flour within the scope of an agitator 6, rotatable on a spindle 5 in the back and front walls of the bin and which is operable from the front by a small removable crank-handle 7. The drawer 8, situated immediately beneath the hopper, receives the flour as it is sifted through the screen 9. The space on the opposite side of the base portion in front is divided into a series of deep drawers 10, the upper one being designed for the reception of table-linen and the lower ones for whole meal of various kinds or similar material. The back section of the base portion is partitioned off from the front to form a cupboard 12 for pots and pans and is closable with a door 13 at each end and furnished with such shelves and hooks as may be necessary.

Slidable in apertures in the side frame just under the table 2 and behind the slide-space of the baking-board 3 is a bar 20, which may be withdrawn from either side and forms a rail on which small articles may be hung to dry. Hinged also to the side frame on one side just beneath the table-top is an ironing-board 21 and lower down a hinged strut 11, which when the board is lifted to the horizontal position will fit into a notch or detent in the under side of it and maintain it rigidly in that position during use.

The upper portion of the cabinet is comparatively much less deep, and its sides 15 rest on the table 2 toward the back of the base portion, to which it may be secured by dowel-pins or other similar device. The lower portion of it stands well above the table 2 of the base portion, so as to leave an ample clear space 16 over the table, and this lower portion is divided into two tiers of shallow drawers, the center ones 17 being of sufficient length to accommodate such articles as cutlery in one and rolling-pins, &c., in the other, the outer drawers 18 on each side being smaller and adapted for the convenient storage of spices, &c. The space above the drawers toward the top is furnished with shelves 19 for dishes, &c., and is closable with glass doors 22.

The whole forms a convenient cabinet of eminently useful parts for a small domestic establishment and combined with an economy of space required and without any elaboration of avoidable expense.

I am aware that cabinets of this general character have previously been patented, but believe that the particular arrangement and convenience of my design possesses advantages which are distinctly novel and patentable.

I therefore claim as new and desire to be protected in by Letters Patent—

In a kitchen-cabinet; a base portion having a flat table, a baking-board slidable beneath the table a bar toward the back immediately beneath the table and slidable outward from either side, an ironing-board hinged to one side immediately beneath the table, and means for supporting such in a horizontal position when required, a flour-bin pivotally opening at the top toward the front and having a sifting-screen in the bottom, and an agitator rotatable by a crank-handle from the front, the bottom of the bin being contracted toward the agitator, a drawer beneath the bin, a series of drawers in the other side of the front, and a cupboard surmounting the base portion and provided with shelves and drawers and having a series of small drawers along the under side sufficiently clear of the table of the base portion to afford sufficient room for its free use as a table.

In testimony whereof I have signed my name to this specification in the presence of two subscribing witnesses.

SHERMAN H. FORD.

Witnesses:
    ROWLAND BRITTAIN,
    ELLICE WEBBER.